(12) United States Patent
Oberthür

(10) Patent No.: US 9,719,807 B2
(45) Date of Patent: Aug. 1, 2017

(54) METHOD FOR PRECISE POSITION DETERMINATION

(71) Applicant: Audi AG, Ingolstadt (DE)

(72) Inventor: Jan Oberthür, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 16 days.

(21) Appl. No.: 14/842,461

(22) Filed: Sep. 1, 2015

(65) Prior Publication Data

US 2016/0072418 A1 Mar. 10, 2016

(30) Foreign Application Priority Data

Sep. 10, 2014 (DE) .......... 10 2014 013 429

(51) Int. Cl.
*G05B 19/40* (2006.01)
*G01D 5/20* (2006.01)

(52) U.S. Cl.
CPC ................ *G01D 5/2093* (2013.01)

(58) Field of Classification Search
CPC ...... H02P 8/00; H02P 8/02; H02P 8/42; H02P 8/22; H02P 8/38
USPC ........................................ 318/685
See application file for complete search history.

(56) References Cited

U.S. PATENT DOCUMENTS

| | | | | |
|---|---|---|---|---|
| 4,982,146 A * | 1/1991 | Moteki | ............ | H02P 8/32 318/685 |
| 5,663,624 A * | 9/1997 | Callaway | ............ | H02P 8/14 318/400.05 |
| 8,810,187 B2 * | 8/2014 | Vu | ............ | H02P 8/38 318/400.09 |
| 2002/0138177 A1* | 9/2002 | Kanayama | ............ | G05B 19/311 700/302 |
| 2003/0033033 A1* | 2/2003 | Lin | ............ | G01D 5/2452 700/56 |
| 2004/0257027 A1* | 12/2004 | Matsuo | ............ | H02P 21/18 318/722 |
| 2005/0217923 A1* | 10/2005 | Onizuka | ............ | B62D 5/0409 180/444 |
| 2007/0012286 A1 | 1/2007 | Vint | | |

FOREIGN PATENT DOCUMENTS

WO    WO 92/14045    8/1992

OTHER PUBLICATIONS

Oriental Motor, "Motion Control 101", pp. 1-6, 2016.*

* cited by examiner

*Primary Examiner* — Bickey Dhakal

(74) *Attorney, Agent, or Firm* — Henry M. Feiereisen LLC

(57) ABSTRACT

In a method of determining a current position of an output element connected to an electric stepper motor, a current position of a rotor of the stepper motor is determined by a rotor position sensor. The determination of the current position of the rotor is refined as a function of information about a currently active phase of the stepper motor, and the current position of the output element is calculated in response to the refined determination of the current position of the rotor.

3 Claims, 1 Drawing Sheet

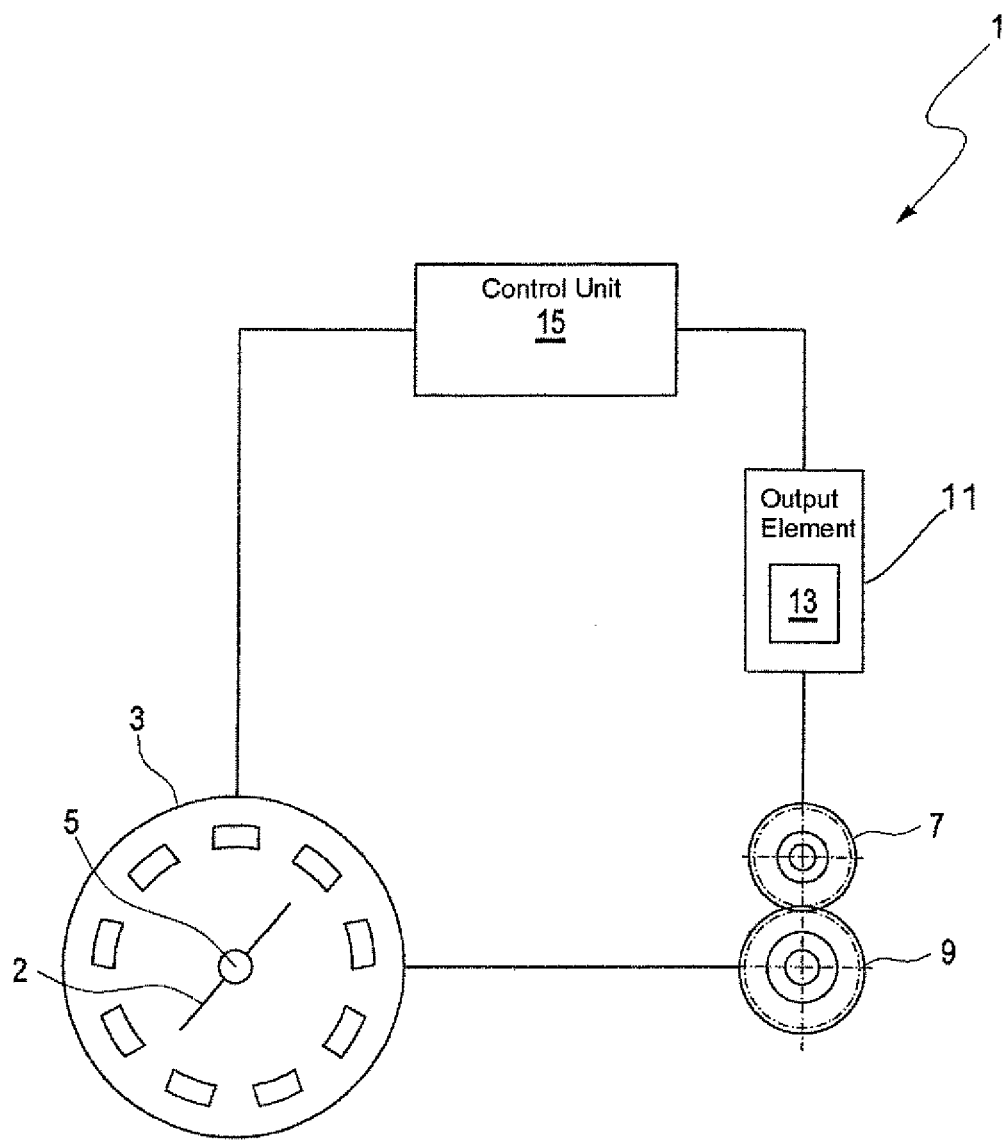

METHOD FOR PRECISE POSITION DETERMINATION

CROSS-REFERENCES TO RELATED APPLICATIONS

This application claims the priority of German Patent Application, Serial No. 10 2014 013 429, filed Sep. 10, 2014, pursuant to 35 U.S.C. 119(a)-(d), the disclosure of which is incorporated herein by reference in its entirety as if fully set forth herein.

BACKGROUND OF THE INVENTION

The present invention relates to a method of determining a current position of an output element that is connected to an electric stepper motor. The present invention further relates to a control unit to execute the method.

The following discussion of related art is provided to assist the reader in understanding the advantages of the invention, and is not to be construed as an admission that this related art is prior art to this invention.

Electric motors, such as stepper motors for example, have a rotor which is moved by a minimal angle or respective step size incrementally by a rotating electromagnetic field. Stepper motors find application, for example, for controlling components, i.e. output elements in a vehicle, which require precise control, i.e. control of very small control steps. Stepper motors can be used, for example, for controlling throttle valves which, in turn, control power output of an internal combustion engine.

To determine a position of the rotor of the stepper motor, the use of a sensor for position feedback, i.e. a rotor position sensor, such as, e.g., an encoder or rotary encoder, is possible because of the fact that stepper motors are electrically commutated motors, i.e. motors with a specific step size.

When the rotor of a stepper motor is excessively accelerated or decelerated, a so-called loss of step may be caused, which means that the rotor is unable to track a rotary field, generated when current is applied to various coils. Thus, when the rotor of the stepper motor is excessively accelerated or decelerated, single steps, i.e. revolutions caused by applying current to the respective coils, are skipped so that the position of the rotor can no longer be accurately ascertained.

A loss of step may be prevented, for example when using a so-called rotor position sensor, such as, e.g., an incremental encoder or absolute value encoder, which measures a rotational orientation or position of the rotor of the stepper motor. Thus, in the presence of a loss of step, operation of the stepper motor can be readjusted, using the rotor position sensor and the stepper motor can be operated up to its capacity.

Oftentimes, electric stepper motors are used in combination with a gear stage, like, e.g., a gear to drive an output element. The stepper motor includes hereby a rotor position sensor for optionally correcting operation of the stepper motor. The output element typically includes an absolute position sensor, e.g. like a Hall sensor, to meet legal requirements and to provide an absolute position signal of a current position of the output element.

It would be desirable and advantageous to address prior art shortcomings.

SUMMARY OF THE INVENTION

According to one aspect of the present invention, a method of determining a current position of an output element connected to a rotor of an electric stepper motor includes determining a sensed current position of the rotor of the stepper motor using a rotor position sensor, and calculating a precise current position of the output element using information about a currently active phase of the stepper motor to offset the sensed position of the rotor.

A method according to the present invention is based on a determination of a precise position signal of a rotor of an electric stepper motor for use in determining a current position of an output element, e.g. throttle valve, connected to the stepper motor.

To ensure clarity, it is necessary to establish the definition of several important terms and expressions that will be used throughout this disclosure.

The term "stepper motor" relates to an electrically commutated machine, especially a brushless DC motor, in which a rotor of the electric machine is constantly moved by a defined angle, or across a defined range, when current is applied to a respective stator coil.

The term "rotor position sensor" relates to a sensor for ascertaining position or angle changes in the rotor of a stepper motor, an incremental encoder in particular. A rotor position sensor can operate magnetically or electrically using sliding rotor contacts.

Rotor position sensors, i.e. incremental sensors, typically provide a defined number of measuring points per revolution of the rotor of the stepper motor. When combining an absolute position signal of a rotor position sensor for determining a position of the rotor of the stepper motor with information about a currently active phase of the stepper motor, the resolution of the rotor position sensor can be increased to a multiple of the resolution provided by the prior art.

Since legal requirements for absolute position sensors normally require a high resolution, e.g. a resolution of 10 bits or more, for respective output elements, e.g. such as a throttle valve, the resolution of such an absolute position sensor can be used for precise measurement of a current position of the rotor of the stepper motor.

As a result of the greater accuracy of the rotor position sensor based on absolute position information, a current position of the rotor of the stepper motor, and thus a current position of the output element connected to the stepper motor, can be calculated in an extremely precise manner.

To accurately calculate a current position angle of an output element, an absolute position of the rotor of the stepper motor is determined sufficiently accurately to allow a conclusion about a current electric phase. When the current electric phase is known, a precise, i.e. particular, angle of a current rotor position can be calculated using a rotor position ascertained by the rotor position sensor. Determination of the precise rotor position, in turn, enables calculation of a current position of the output element in view of a fixed transmission ratio between the rotor and the output element by adding the angle of the current rotor position to a multiple of a current step width of the electric stepper motor.

According to another advantageous feature of the present invention, a difference between the position of the rotor and the position of the output element can be determined using a mechanical stop, and the difference can be used in calculating the current position of the output element.

To enable the comparison between rotor position sensor and output element to be as precise as possible, provision can be made for moving the rotor of the stepper motor and a shaft of the output element against a mechanical stop, the position of which is known so that measured values determined by the rotor position sensor or an absolute position sensor of the output element can be referenced as the defined position or adjusted by an offset.

According to another advantageous feature of the present invention, the current position of the rotor of the electric stepper motor can be calculated as a function of a gear ratio of the stepper motor and/or a currently active phase number and/or a resolution of the absolute position sensor.

To calculate the current position of the rotor of the stepper motor, a currently active phase may, for example, be used at a current electric step to calculate a precise rotor position value using respective measured values determined by the rotor position sensor.

According to another advantageous feature of the present invention, the position value can be used to determine the plausibility of the position information of the output element determined by an absolute position sensor of the output element.

By using a signal calculated by considering measured values of the rotor position sensor and the absolute position sensor, it is possible to check the plausibility, i.e. to check correctness, of a signal measured and adjusted by either the rotor position sensor or the absolute position sensor alone.

As a result of the precise positional calculation, using the rotor position sensor and the information about the currently active phase allows conclusion about a malfunction of an absolute position sensor of the output element, so that it is possible to verify a sensor signal of the absolute position sensor of the output element in response to a difference or deviation of the calculated accurate rotor position and the accurate position of the output element, and to generate a warning in the presence of a deviation above a defined threshold value.

According to another aspect of the present invention, a control unit for a vehicle having an output element connected to a rotor of a stepper motor can be configured to determine a sensed current position of the rotor of the stepper motor using a rotor position sensor; and calculate a precise current position of the output element using information about a currently active phase of the stepper motor to offset the sensed position of the rotor.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIGURE, FIG. 1 shows a schematic illustration of an arrangement in which an electric stepper motor cooperates with a control unit in accordance with the present invention.

DETAILED DESCRIPTION OF PREFERRED EMBODIMENTS

The depicted embodiment is to be understood as illustrative of the invention and not as limiting in any way. It should also be understood that the FIGURE is not necessarily to scale and that embodiments are sometimes illustrated by graphic symbols, phantom lines, diagrammatic representations and fragmentary views. In certain instances, details that are not necessary for understanding the present invention or that render other details difficult to perceive have been omitted.

Turning now to FIG. 1, there is shown a schematic illustration of an apparatus generally designated by reference numeral 1 and including an electric stepper motor 3 with a rotor 2 having a rotor position sensor 5, a gear stage having gears 7, 9, an output element 11 having an absolute position sensor 13, and a control unit 15.

Using known information about a currently active phase of the stepper motor 3 and position information about the rotor 2 as ascertained by the rotor position sensor 5, the control unit 15 calculates an accurate rotor position or position information about the rotor 2. In view of the calculated precise rotor position and based on a known transmission ratio of the gears 7, 9, the control unit 15 is then able to calculate a current position of the output element 11 that is connected to the stepper motor 3 via the gears 7, 9. In addition, the control unit 15 adjusts the calculated precise rotor position using measured values ascertained by the absolute position sensor 13, or on a calculated difference. For example, the gears 7, 9, may provide a transmission ratio of 150:1 between the electric stepper motor 3 and the output element 11. In the event that the electric stepper motor 3 is operated by 5 phases and the output element 11 has an adjustment range of 90°, the rotor 2 of the electric stepper motor 3 rotates in the adjustment range of the output element 11 $n=150*90°/360°=37.5$ times. Since there are 5 phases, the rotor position sensor 5 passes $37.5*5=187.5$ electric cycles so that 2.1 electric cycles of the rotor position sensor 5 are realized per degree of the adjustment angle of the output element 11.

The passing electric cycles of the rotor position sensor 5 produce a necessary resolution for the absolute position sensor 13 of the output element 11. To determine a current electric cycle, a current adjustment angle of the output element 11 is calculated by a sum of a normalized angle of the output element 11 and a current angle of the rotor 2. The normalized angle of the output element 11 is provided as a rounded sum of a multiple of an offset determined using a reference position and a ratio of the adjustment range to the number of electric cycles in the adjustment range, for example. Thus, a normalized angle of the output element 11 for the afore-described case is as follows:

Rounding of a signal of the output element 11 to a multiple of (90°/187 electric cycles)+learned offset.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method of determining a current position of an output element connected to a rotor of an electric stepper motor, comprising:
   determining by a control unit a sensed current position of the rotor of the stepper motor using a rotor position sensor;
   calculating a precise current position of the output element using information about a currently active phase and a gear ratio of the stepper motor to offset the sensed position of the rotor by the rotor position sensor; and
   generating a warning in the presence of a deviation of the precise current position of the output element above a defined threshold by the control unit; and determining a position difference between the sensed current position of the rotor and the precise current position of the output element using a mechanical stop, and using the position difference to calculate the current position of the output element.

2. The method of claim 1, further comprising determining an absolute position of the output element using position information provided by an absolute position sensor, calculating a difference position or offset position from the sensed current position of the rotor and the absolute position of the output element, and using the difference position or the offset position as information for determining the plausibility of the absolute position of the output element.

3. Apparatus for a vehicle, comprising:
an electric stepper motor with a rotor, said electric stepper motor including a rotor position sensor;
a gear stage including at least one gear which is connected to the electric stepper motor, and an output element having an absolute position sensor; and
a control unit configured to determine a sensed current position of the rotor of the stepper motor using the rotor position sensor, to calculate a precise current position of the output element using information about a currently active phase and a gear ratio of the stepper motor to offset the sensed position of the rotor, and to generate a warning in the presence of a deviation of the precise current position of the output element above a defined threshold, and to determine a position difference between the sensed current position of the rotor and the precise current position of the output element using a mechanical stop, and using the position difference to calculate the current position of the output element.

* * * * *